United States Patent
Briganti et al.

(10) Patent No.: US 10,575,536 B2
(45) Date of Patent: Mar. 3, 2020

(54) EDIBLE CUP AND METHOD OF MAKING THE SAME

(71) Applicant: LOLIWARE INC., Beacon, NY (US)

(72) Inventors: Chelsea Briganti, Brooklyn, NY (US); Leigh Ann Tucker, Brooklyn, NY (US); Ingrid Zweifel, New York, NY (US); Monica Bhatia, Brooklyn, NY (US); Kevin Stanton, Stanfordville, NY (US)

(73) Assignee: LOLIWARE INC, Beacon, NY (US)

( * ) Notice: Subject to any disclaimer, the term of this patent is extended or adjusted under 35 U.S.C. 154(b) by 402 days.

(21) Appl. No.: 14/464,235

(22) Filed: Aug. 20, 2014

(65) Prior Publication Data

US 2014/0356490 A1    Dec. 4, 2014

Related U.S. Application Data

(63) Continuation of application No. 13/937,806, filed on Jul. 9, 2013, now abandoned.

(60) Provisional application No. 61/692,501, filed on Aug. 23, 2012.

(51) Int. Cl.
| | |
|---|---|
| *A23G 3/50* | (2006.01) |
| *A23G 3/36* | (2006.01) |
| *A23P 30/10* | (2016.01) |
| *A23G 3/56* | (2006.01) |

(52) U.S. Cl.
CPC ............... *A23G 3/50* (2013.01); *A23G 3/36* (2013.01); *A23G 3/566* (2013.01)

(58) Field of Classification Search
CPC .... A23G 3/50; A23G 3/34; A23G 3/00; A23P 1/086; A23L 1/0524; A23L 1/052; A21D 13/0029; B65D 65/463

USPC ................. 426/138, 139, 390, 575
See application file for complete search history.

(56) References Cited

U.S. PATENT DOCUMENTS

| | | | | |
|---|---|---|---|---|
| 4,205,093 | A | * | 5/1980 | Blake ........................... 426/333 |
| 4,390,553 | A | | 6/1983 | Rubenstein et al. |
| 4,472,440 | A | | 9/1984 | Bank |
| 4,505,220 | A | | 3/1985 | Bank et al. |
| 4,603,051 | A | | 7/1986 | Rubenstein et al. |
| 4,853,236 | A | * | 8/1989 | Langler ........................ 426/102 |
| 5,162,126 | A | | 11/1992 | Thörner et al. |
| 5,188,861 | A | * | 2/1993 | Mazin et al. ................. 426/640 |
| 5,840,354 | A | * | 11/1998 | Baumann et al. .............. 426/74 |
| 6,068,866 | A | | 5/2000 | Petrini et al. |

(Continued)

FOREIGN PATENT DOCUMENTS

| | | |
|---|---|---|
| CA | 2 757 662 | 10/2010 |
| CN | 1149547 | 5/1997 |

(Continued)

OTHER PUBLICATIONS

P. Kendall, J. Dofos. Leathers and Jerkies : Fruit Leather, May 2012, Colorado State University Extension, Fact Sheet No. 9.311 Food and Nutrition Series, p. 1. Quick Facts.*

(Continued)

*Primary Examiner* — Erik Kashnikow
*Assistant Examiner* — Ashley Axtell
(74) *Attorney, Agent, or Firm* — Perkins Coie LLP (57) ABSTRACT

The present invention relates to an edible container made of liquid, sugar, and one or more hydrocolloids. The edible container may hold hot or cold liquids for extended periods of time.

14 Claims, 12 Drawing Sheets

(56) References Cited

U.S. PATENT DOCUMENTS

| | | | |
|---|---|---|---|
| 6,423,357 B1* | 7/2002 | Woods et al. | 426/138 |
| 6,783,790 B1 | 8/2004 | Emsing et al. | |
| 7,211,283 B2* | 5/2007 | Jones et al. | 426/138 |
| 2005/0260329 A1* | 11/2005 | Yusuf | A23G 3/0008 |
| | | | 426/660 |
| 2006/0034976 A1* | 2/2006 | Cotten | A23G 3/0025 |
| | | | 426/103 |
| 2006/0110498 A1* | 5/2006 | Dellinger et al. | 426/106 |
| 2006/0198930 A1* | 9/2006 | Royo et al. | 426/94 |
| 2010/0068350 A1 | 3/2010 | Shen et al. | |
| 2010/0266744 A1* | 10/2010 | Dwivedi | 426/576 |
| 2011/0159154 A1* | 6/2011 | Ang | A23G 3/007 |
| | | | 426/103 |
| 2011/0217432 A1* | 9/2011 | Krnic | A23G 3/007 |
| | | | 426/238 |
| 2014/0113034 A1 | 4/2014 | Bartkowska et al. | |

FOREIGN PATENT DOCUMENTS

| | | |
|---|---|---|
| CN | 101838405 | 9/2010 |
| CN | 103087356 | 5/2013 |
| EP | 0 045 522 | 2/1982 |
| EP | 0 790 777 | 8/1997 |
| EP | 1 951 056 | 8/2008 |
| WO | WO-2012/175266 | 12/2012 |
| WO | WO-2014/028654 | 2/2014 |

OTHER PUBLICATIONS

Agar-Agar. AgarGel. Jan. 6, 2009. Retrieved from: <https://web.archive.org/web/20090106162904/http://www.agargel.com.br/agar-tec-en.html>.*

Carrageenan. AgarGel. Nov. 21, 2008. Retrived from: <https://web.archive.org/web/20081121213041/http://www.agargel.com.br/carrageenan.html>.*

How to use Agar. The British Larder. Apr. 7, 2010. Retrieved from: <http://www.britishlarder.co.uk/howtouseagaragar/>.*

AgarGel. Dec. 2009. Retrieved from: <https://web.archive.org/web/20091225151638/http://www.agargel.com.br/agar-tec-en.htm>I.*

Briganti et al., U.S. Office Action dated Apr. 8, 2015, directed to U.S. Appl. No. 14/179,236; 16 pages.

Briganti et al., U.S. Office Action dated Apr. 10, 2015, directed to U.S. Appl. No. 13/937,806; 17 pages.

Karo Syrup FAQ. (Sep. 19, 2008). "Frequently Asked Questions," located at <http://web.archive.org/web/20080919064628/http://www.karosyrup.com/faq.html> retrieved on Mar. 31, 2015. (2 pages).

FMC BioPolymer. (Feb. 21, 2010). "Carrageenan/Disperse & Solubilize," located at <http://web.archive.org/web/20100221020746/http://www.fmcbiopolymer.com/Food/Ingredients/Carrageenan/DisperseSolubilize.aspx> retrieved on Apr. 2, 2015. (3 pages).

Herbstreith & Fox. (Nov. 2007). "Techniques for the Addition of Pectin into the Product Batch," located at <http://web.archive.org/web/20071108170157/http://www.herbstreith-fox.de/fileadmin/tmpl/pdf/awtinfo/AWT_Techniques_for_the_Addition_of_Pectin.pdf> retrieved on Apr. 2, 2015. (6 pages).

* cited by examiner

6 oz Cup 2 oz Cup

FIG. 6

6 oz Cup
Front 2 oz Cup
Front

3D Print Part 3

Pattern Insert

Fig. 9

3D Print Part 2 with Pattern Insert

Fig. 10

Silicone Cup

Fig. 11

Loliware Mold Part A	Loliware Mold Part B

FIG. 12

EDIBLE CUP AND METHOD OF MAKING THE SAME

CROSS-REFERENCE TO RELATED APPLICATIONS

This application is a continuation of U.S. application Ser. No. 13/937,806, filed Jul. 9, 2013, which claims the benefit of U.S. Provisional Patent Application Ser. No. 61/692,501, filed Aug. 23, 2012, the entire contents of which are incorporated herein by reference.

FIELD OF THE INVENTION

The present invention relates to edible containers for holding liquids for consumption. Specifically, the invention relates to edible cups made from natural ingredients, capable of holding hot or cold liquids for extended periods of time.

BACKGROUND OF THE INVENTION

Disposable cups made from plastics or plastic lined paper are a commonly used alternative to reusable drinking cups for their low cost and convenience. Both styrofoam and paper cups can hold hot liquids for extended periods of time. However, disposable cups are not good for the environment. Because they are not biodegradable, they litter the environment or fill landfills. In addition, the plastics used in disposable cups are derived from fossil fuels.

Edible cups are an alternative to disposable cups that are better for the environment. Edible cups do not produce the harmful waste of disposable cups because they are eaten or quickly biodegrade if discarded. The most common types of edible cups, such as ice cream cones, are made from baked dough. These cups are made by pouring batter into a mold and then baking, forming dough around a mandrel and then baking, or baking and quickly forming. However, these types of edible cups cannot hold liquids for extended periods of time because they are not waterproof. One solution to this problem is to coat the dough cup with a waterproof layer. U.S. Pat. No. 6,068,866 to Petrini discloses an edible cup made of twice-baked pastry with a waterproof layer made of sugar, water, starch, and gum that is capable of containing hot and cold drinks without leaking or losing its structural integrity. However, this additional layer requires an added coating process and the cups are still limited to the structural integrity of baked dough.

Another type of edible cup is made from dehydrated fruits or vegetables. U.S. Pat. No. 6,423,357 to Woods discloses an edible container, which can hold and contain low viscosity liquids for extended periods of time, made of dehydrated fruit or vegetable formed into strips and wrapped around a mandrel. However, dehydrated fruit and vegetable is susceptible to rehydration when in contact with a liquid. Additionally, cups such as these suffer from both the strength limitations of the dehydrated fruit or vegetable and the difficulty in forming the dehydrated material into a cup shape.

Accordingly, there is a need for an improvement over existing disposable cups that is edible, biodegradable, easily formed into cup shapes and can hold hot and cold liquids for extended periods of time without losing its structural integrity.

SUMMARY OF THE INVENTION

The present invention relates to edible containers for holding liquids for consumption. Specifically, the invention relates to edible containers made from natural ingredients, capable of holding hot or cold liquids for extended periods of time. In one embodiment, the edible container is comprised of liquid, sugar and one or more hydrocolloids. In another embodiment, the edible container is made by combining liquid, sugar, and one or more hydrocolloids, heating the mixture to dissolve the sugar and one or more hydrocolloids and to set the one or more hydrocolloids, and pouring the heated mixture into a mold so as to allow the mixture to harden. In another embodiment, the edible container is made by placing water and $CaCl_2$ in a pot and allowing the $CaCl_2$ to dissolve into the water; adding a sugar to the pot to form a mixture after the $CaCl_2$ is dissolved, heating the pot while continuing to whisk the mixture until the sugar dissolves, adding a citric acid to the mixture in which the sugar is dissolved, adding a vegetable glycerin to the mixture to which the citric acid is added, when the mixture to which the glycerin is added reaches about 150° F., adding an agar to the mixture so as to form a thin coat over a surface of the mixture, whisking the mixture containing the agar to dissolve the agar, boiling the mixture in which the agar is dissolved, when the boiled mixture is cooled to about 200° F., adding a pectin to the mixture, stirring the mixture containing the pectin, adding the vegetable glycerin to the stirred mixture, when the stirred mixture reaches about 185° F., adding a carrageenan while blending the mixture, so that, when all the carrageenan is in the mixture, the mixture reaches 180° F. and not beyond 190° F., blending the mixture containing the carrageenan, and pouring the blended mixture into a mold so as to allow the mixture to harden.

DETAILED DESCRIPTION OF THE INVENTION

The invention is directed to an edible and biodegradable cup that can hold hot or cold liquids for extended periods of time. The cup can be easily molded into different shapes and does not require a coating process. The cup is made essentially of natural materials that are safe to eat and is a delicious alternative to disposable cups destined for the landfill. The cup can be eaten as the drink it contains is sipped. People can use the edible cup at parties and events in place of disposable cups or in other contexts where disposable cups would normally be used.

The edible cup is typically made of liquid, sugar, and one or more hydrocolloids. Examples of preferred hydrocolloids are agar, carrageenan and pectin. Additional ingredients such as vegetable glycerin, $CaCl_2$ and citric acid may also be used.

Liquid

Any edible liquid may be used. Water is used in a preferred embodiment. Additional liquids that may be used are juice, juice concentrate, cane juice, milk, rice syrup, corn syrup, tapioca syrup, agave (syrup or nectar), high fructose corn syrup, golden syrup, malt syrup, simple syrup (any other sugar and water mixture), invert sugar, treacle, any alcohol, energy drinks, caffeinated coffee, decaffeinated coffee, caffeinated beverages, carbonated beverages, such as soda or sparkling waters, nut milks, coconut milk, flavored milks, alkaline water, purified waters, flavored waters, teas, tea infusions, hot chocolate, ciders, cold-pressed juices, sports drinks, coconut water, fermented liquids, such as kombucha and kvass, herbal infusions, chocolate syrup, coconut syrup, maple syrup, carob molasses, any fruit flavored molasses, such as grenadine molasses, grape molasses and pomegranate molasses. fruit and herbal flavored syrups, such as rose syrup, mint syrup, date syrup, sour cherry syrup, almond syrup and jelab syrup, barley malt syrup, birch syrup, honey, raw honey, palm syrup, sorghum syrup, sugar beet syrup, yacon syrup, and Torani syrups.

Sugar

Any sugar may be used. Evaporated cane juice crystals, such as Wholesome Sweeteners Brand Evaporated Cane Juice Crystals, is used in a preferred embodiment. Other sugars that may be used are sucrose, glucose, dextrose, lactose, maltose, xylose, fructose, and galactose. Sucrose is a disaccharide also called saccharose comprised of 50% fructose and 50% glucose. Types and names of sucrose are white sugar, castor sugar, table sugar, cane sugar, cane crystals, cane juice crystals, evaporated cane juice crystals, yellow sugar, golden sugar, demerara sugar, muscavado sugar, turbinado sugar, brown sugar, beet sugar, and date sugar. Glucose is a simple sugar, or monosaccharide. Types and names of glucose are D-glucose, dextrose, corn sugar, and grape sugar. Fructose is a simple sugar, or monosaccharide, found in fruits. Types and names of fructose are fruit sugar and crystalline fructose. Galactose is also a simple sugar, or monosaccharide.

Hydrocolloid

A hydrocolloid is a substance that can gel when combined with water and is defined as a type of mechanical mixture where one substance is dispersed evenly throughout a water-containing liquid. Many hydrocolloids can change their physical behavior and characteristics with the addition or elimination of heat and have the ability to thicken and form gels at low concentrations. Hydrocolloids are generally polysaccharides (complex sugars), and when dissolved in water, the water is attracted to the sugar molecular units, forming a layer of water with restricted movement. This restriction of water movement gives hydrocolloids their ability to gel. Different hydrocolloids have different physical properties and different chemical properties such as molecular size, charge, and the distribution and composition of different side chains along the main sugar chain. These differences result in different gelling behaviors. Types of hydrocolloids include agar, pectin, carrageenan, gelatin, corn starch, gellan, guar gum, gum arabic, isomalt, konjac, lecithin, locust bean gum, maltodextrin, methylcellulose, sodium alginate, xanthan gum, and tapioca. Agar, carrageenan and pectin are used in a preferred embodiment.

Agar

Agar, also referred to as agar-agar, is a hydrocolloid and a natural vegetable counterpart to animal-derived gelatin. Agar is a flavorless gelling agent derived from a polysaccharide in red algae, where it accumulates in the cell walls. In chemical terms, agar is a polymer made up of subunits of the sugar galactose. The primary source for this substance is gracilaria lichenoides. To extract the substance, the algae is boiled, cooled, purified, and dried. Agar is commonly used as an ingredient in desserts and as a vegetarian gelatin substitute. Pure agar comes in a number of forms including blocks, flakes, and granules. It is usually translucent, unless it has been dyed before drying. A type of agar used in a preferred embodiment is TIC Pretested Agar Agar 100-44 HG.

Carrageenan

Carrageenan is a hydrocolloid derived from certain types of red algae and is similar to agar. The product is most often used as a stabilizing agent and a thickening agent in place of animal-based products like gelatin. Because it comes from algae, it can be used for vegetarian and vegan products. There are three main classes of carrageenan—kappa, iota, and lambda—each of which have different gel strengths. The kappa class produces a solid, firm gel when mixed with water. The iota class produces a soft gel when mixed with water, and tends to gel more easily when combined with calcium. The lambda class does not gel in water and is more often used as a thickener than a gelling agent. Kappa-carrageenan is used mostly in breading and batter due to its gelling nature. Lambda carrageenan assists in binding, retaining moisture, and in contributing to viscosity in sweet doughs. Iota carrageenan is used primarily in fruit applications and requires calcium ions to develop a heat-reversible and flexible gel. All carrageenans are high-molecular-weight polysaccharides made up of repeating galactose units. A type of carrageenan used in a preferred embodiment is TIC Ticaloid 710 H-96 Powder.

Pectin

The hydrocolloid, Pectin, is a soluble gelatinous polysaccharide that is present in ripe fruits. In food products, pectin is used as a gelling agent, thickening agent, and stabilizer. Fruits naturally contain this gelling agent, including apples, plums, and pears. Pectin is a complex carbohydrate, which is found both in and between the cell walls of plants, helping to regulate the flow of water between cells and keeping them rigid. Pectin is usually available in powdered form and may be made from apple pomace or orange peels. It does not add flavor to foods and works well as a thickening agent. Pectin is normally diluted to the correct concentration with sugar and some citric acid to adjust pH. A type of pectin used in a preferred embodiment is Gillco Pectin RS 461 (powdered citrus pectin).

Vegetable Glycerin

Vegetable glycerin, also called glycerol, is a carbohydrate that is derived from plant oils. It is a colorless, odorless, viscous liquid that is used in foods and beverages as a humectant, solvent, sweetener, and thickener. Glycerin is an organic compound that has three hydroxyl groups that are responsible for its solubility in water and its hygroscopic nature. These hydroxyl groups form hydrogen bonds with water, slowing down its movement and giving liquid glycerin the property of a syrup. The glycerin backbone is central to all lipids known as triglycerides. Glycerin is sweet-tasting and of low toxicity. Vegetable glycerin is made from the oils and fats of a plant-based ingredient, for example coconut, palm, or soybean oil. The oil is heated to a high temperature under pressure with water. The glycerin backbone splits off from the fatty acids, and is absorbed by the water, from which it is isolated and distilled. Vegetable oil, canola oil, olive oil, and nut oils are types of vegetable glycerin that may be used.

$CaCl_2$

Any $CaCl_2$ product may be used. Table salt may also be used.

Citric Acid

Citric acid is a natural preservative used to add an acidic, or sour, taste to foods and soft drinks. Usually produced in powder form, citric acid is naturally found in citrus fruits. It easily mixes into liquids, making it a valuable acid. Citric acid is a weak organic acid that bonds easily to minerals and metals. A type of citric acid used in a preferred embodiment is Cargill Citric Acid Anhydrous C.A.S. No. 77-92-9 Fine Granular. Alternatives such as lemon juice, lemon powder, ascorbic acid, tartaric acid, malic acid, and sour salt may also be used.

Edible cups can be made with a concentration of 24% to 72% by weight of water, 5% to 48% by weight of sugar, and 1% to 10% by weight of hydrocolloids.

Edible cups may also be made with 25% to 76% by weight of water, 5% to 41% by weight of sugar, 0.2% to 2.5% by weight of agar, 1.2% to 5.1% by weight of carrageenan, and 0.1% to 2.8% by weight of pectin.

In the edible cup of one embodiment, the water has a concentration of 67.22% by weight, the sugar has a concentration of 27.94% by weight, the vegetable glycerin has a concentration of 0.70% by weight, the agar has a concentration of 0.78% by weight, the carrageenan has a concentration of 2.65% by weight, the pectin has a concentration of 0.40% by weight, the $CaCl_2$ has a concentration of 0.03% by weight, and the citric acid has a concentration of 0.28% by weight.

The edible cup may also include, for example, agave powder, stevia, saccharin, aspartame, dextrose, maltodextrin, agave nectar, Ascesulfame K, Sucralose, barbados sugar, barley malt, corn sweetener, corn syrup solids, crystalline fructose, dextrin, dextran, d-mannose, glucose solids, honey, lactose, maltose, mannitol, maple syrup, sorbitol, liquid and powdered vitamins, minerals, electrolytes, caffeine, pieces gelled inside the gel like flower petals, plant seeds, candies, sprinkles, any edible decorations, edible gold and silver, chocolate pieces, coconut flakes, dehydrated fruit, dehydrated vegetables, herbs, nuts, seeds, and edible confetti.

The edible cup may also include a coloring agent. Examples of coloring agents are International Foodcraft Corporation #CD 801—White Shade Dispersion "A" for white, GNT EXBERRY® Shade "Summer Red" Product No: 843301+Color Maker Natural Saffron Yellow Color Formula No. 3635C for orange, Color Maker Natural Saffron Yellow Color Formula No. 3635C for yellow, GNT EXBERRY® Shade "Summer Red" Product No: 843301 for red, and World Organic Liquid Chlorophyll for green. Depending on the coloring agent or agents chosen, the edible cups may be translucent, opaque, or completely clear and colorless.

The edible cup may also include a flavoring agent. Examples of flavoring agents are Frontier Non-Alcoholic Vanilla Flavor for vanilla, Mutual Flavors J01430 Jalapeno Flavor Natural for pepper, Mutual Flavors L02830 Lemon Flavor O.S. Natural WONF for lemon, Mutual Flavors S41130 Bitters Spice Blend Flv Type O.S., NAT for bitters, and Mutual Flavors L36530 Lime Flavor Natural for lime.

Depending on the formulation, the edible cups can contain liquids ranging from 32 to 180 degrees Fahrenheit. The edible cup can also hold liquids containing ice. The ideal holding time for cold and hot liquids is one hour. The edible cup can hold liquid for up to twenty-four hours before degrading. Adjusting the ingredients used to make the edible cup can produce different durometers (hardnesses), textures, and other properties. The edible cup according to one embodiment is made to look like a real glass cup.

Exemplary structures of the edible cup are shown in FIGS. 1-6.

Figure 1:
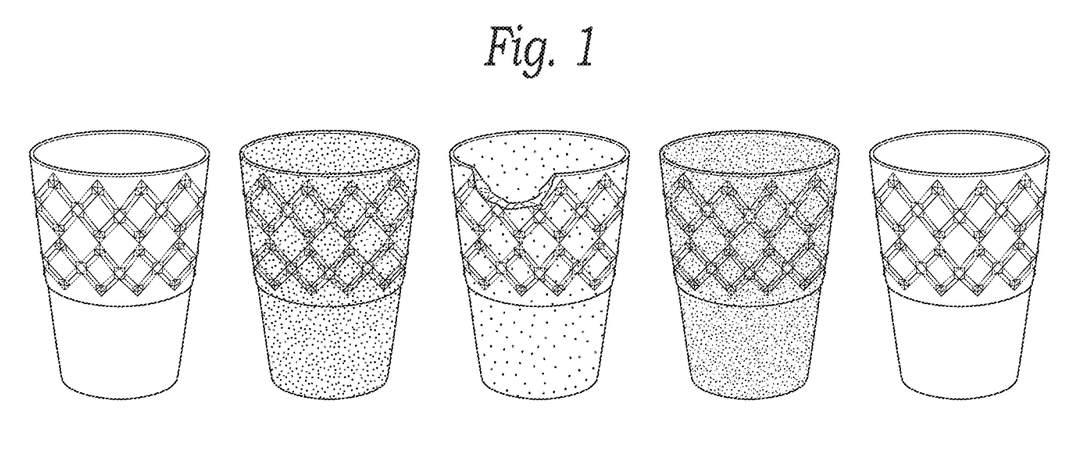
FIG. 1 is a view of five colored, edible cups according to the invention.

FIG. 1 is an example of five different color and flavor varieties of an embodiment of the invention. The cups, from left to right, are opaque white (colored with International Foodcraft Corporation #CD 801—White Shade Dispersion "A") with vanilla flavoring (flavored with Frontier Non-Alcoholic Vanilla Flavor for vanilla), translucent orange (colored with GNT EXBERRY® Shade "Summer Red" Product No: 843301+Color Maker Natural Saffron Yellow Color Formula No. 3635C) with pepper flavoring (flavored with Mutual Flavors J01430 Jalapeno Flavor Natural), translucent yellow (colored with Color Maker Natural Saffron Yellow Color Formula No. 3635C) with lemon flavoring (flavored with Mutual Flavors L02830 Lemon Flavor O.S. Natural WONF), translucent red (colored with GNT EXBERRY® Shade "Summer Red" Product No: 843301) with bitters flavoring (flavored with Mutual Flavors S41130 Bitters Spice Blend Flv Type O.S., NAT) for bitters, and translucent green (colored with World Organic Liquid Chlorophyll) with lime flavoring (flavored with Mutual Flavors L36530 Lime Flavor Natural). The bottoms are flat and the sides are slightly tapered with designs molded into the outside. Notably, these edible cups look like a regular glass cup with a cut glass pattern.

Figure 2:
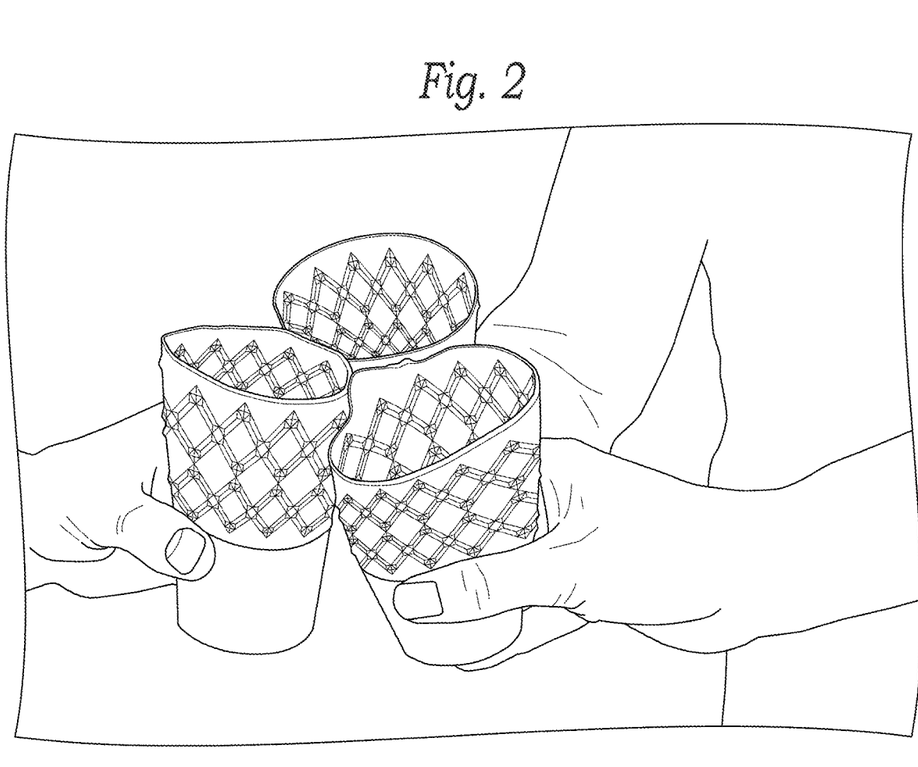
FIG. 2 is a view of three edible cups according to the invention that contain liquid, are hand-held, and are being deformed.

FIG. 2 is an example of edible cups according to the invention being held, which demonstrates their size relative to an adult hand. The cups are shown containing a cold liquid demonstrating that they retain their structural integrity while containing liquid and being grasped. The side walls are being pressed in by the holder's fingers while continuing to contain liquid. This example demonstrates that the edible cup in this embodiment has flexible walls, which can be easily hand manipulated while the cup continues to hold liquid and not leak.

Figure 3:
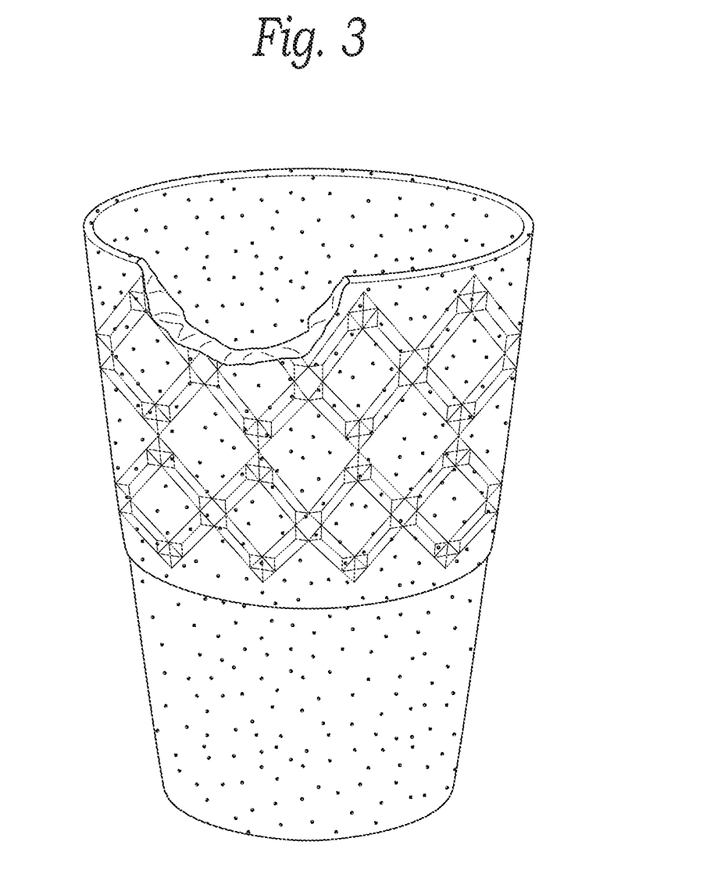
FIG. 3 is a perspective view of an edible cup according to the invention showing bites missing.

FIG. 3 is an example of another embodiment according to the invention. This has a tapered side wall and a flat bottom. The cup is colored translucent yellow and is shown with "bites" of it taken out demonstrating that the cup is edible. As shown, the cup's flat bottom allows it to be placed on a flat surface where it is self-supporting.

Figure 4:
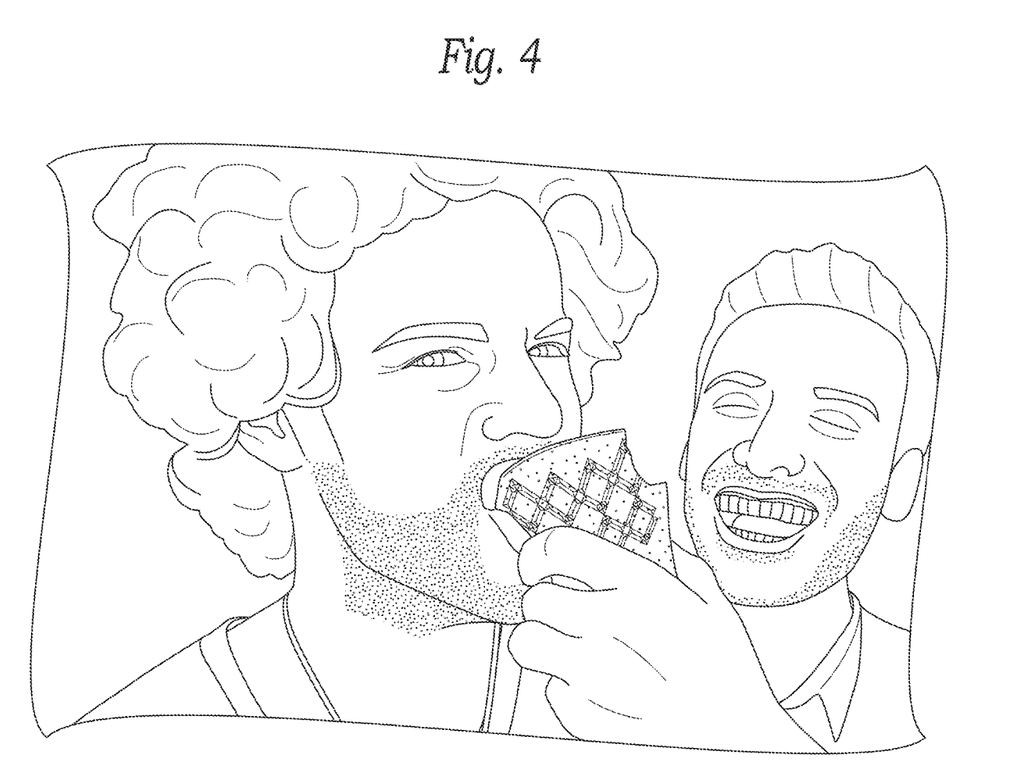
FIG. 4 is a view of an edible cup being eaten.
Figure 5:
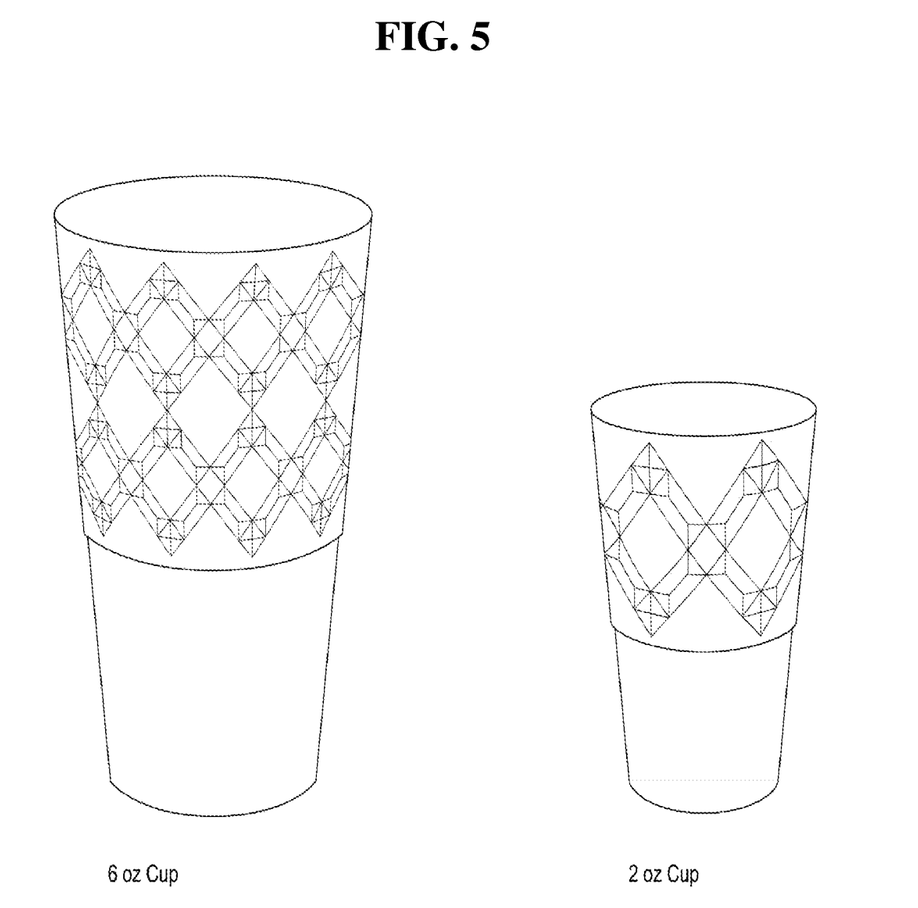
FIG. 5 is a 3D perspective drawing of a 6 oz and 2 oz cup.
Figure 6:
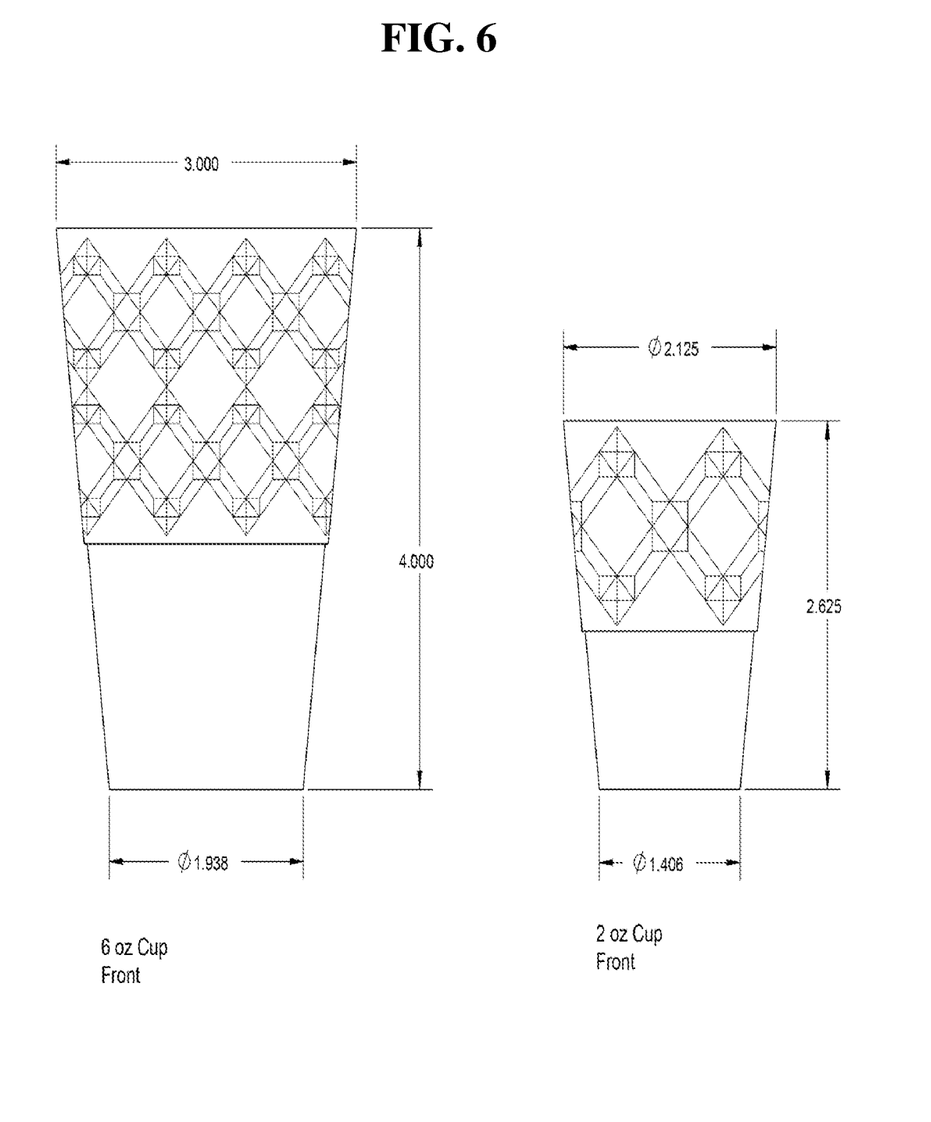
FIG. 6 is a technical drawing for a 6 oz and 2 oz cup.

FIG. 4 is a view of an example of an edible cup being eaten. FIG. 5 is a 3D perspective drawing of a 6 oz and 2 oz cup. FIG. 6 is a technical drawing for a 6 oz and 2 oz cup.

EXAMPLES

In one embodiment, the edible cup is made from 120 ml of liquid, 73 g of sugar, and 15 g of hydrocolloids. The method for making the cup of this embodiment includes combining the liquid, the sugar, and the hydrocolloids, heating the mixture to dissolve the ingredients and set the hydrocolloids, and molding the mixture and allowing it to set. The amounts of these ingredients may be modified to achieve different desired properties. Other embodiments may contain 50 ml to 150 ml of liquid, 10 g to 100 g of sugar, and 2 g to 20 g of hydrocolloids.

In another embodiment, the edible cup is made from 120 ml of liquid, 62 g of sugar, 4 g of agar, 8 g of carrageenan, and 4 g of pectin. The method for making the cup of this embodiment includes combining the liquid, the sugar, the agar, the carrageenan, and the pectin, heating the mixture to dissolve the ingredients and set the hydrocolloids, and molding the mixture and allowing it to set. The amounts of these ingredients may be modified to achieve different desired properties. Other embodiments may contain 50 ml to 150 ml of liquid, 20 g to 80 g of sugar, 0.5 g to 5 g of agar, 2.5 g to 10 g of carrageenan, and 0.25 g to 5.5 g of pectin.

In another embodiment, the edible cup is made from 240 ml of water, 100 g of sugar, 2.5 g of vegetable glycerin, 2.8 g of agar, 9.5 g of carrageenan, 30 g of liquid pectin, 0.1 g of $CaCl_2$, and 1 g of citric acid. The method for making the cup includes combining water and $CaCl_2$ in a cooking pot and allowing the $CaCl_2$ to dissolve into the water. Once the $CaCl_2$ is dissolved, the sugar is added to the pot and the heat is reduced to medium high. The mixture is continually whisked until the sugar completely dissolves. Once the sugar is fully incorporated, the citric acid is added followed by one-half of the glycerin. Once the solution reaches around 170° F., the agar is added to the liquid slowly, forming a thin coating over the surface of the liquid, and whisked until completely dissolved. The liquid is brought back to a boil and cooked for two minutes and thirty seconds. The heat is then turned off. Liquid pectin is added when the temperature falls to 200° F. The mixture is stirred and the remaining glycerin is added. When the temperature falls to 185° F., the carrageenan is added by starting the immersion blender and then adding the carrageenan and blending until it is smooth and forms a whirlpool motion. When all the carrageenan is in the mixture, the temperature should be between 180° F. and 190° F. To reduce the bubbles, the liquid slowly poured back and forth into another container a few times and then pour through a fine sieve. Finally, the mixture is poured into the mold and allowed to harden.

The liquid pectin as used above is a mixture of water and pectin. The liquid pectin is made using 1 liter of water and 50 grams of pectin. First, the water is heated to 75 degrees Celsius in a pot. Then, the heat is turned off and the pectin is mixed into the water until the mixture is completely homogenous. Finally, the mixture is cooled completely, allowing it to form a gel.

In the above embodiment and method of making, about 28 g of water is lost to evaporation due to heating. Therefore, the amount of water in the finished edible cup of this embodiment is 240.6 g.

Figure 7:
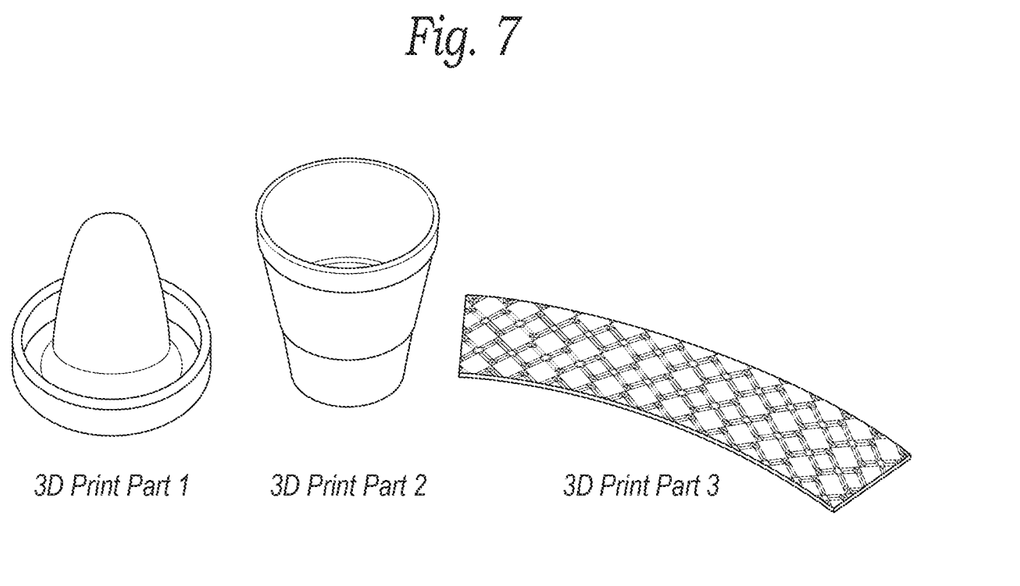
FIG. 7 is a view of the 3D printed parts used to make the production molds.
Figure 8:
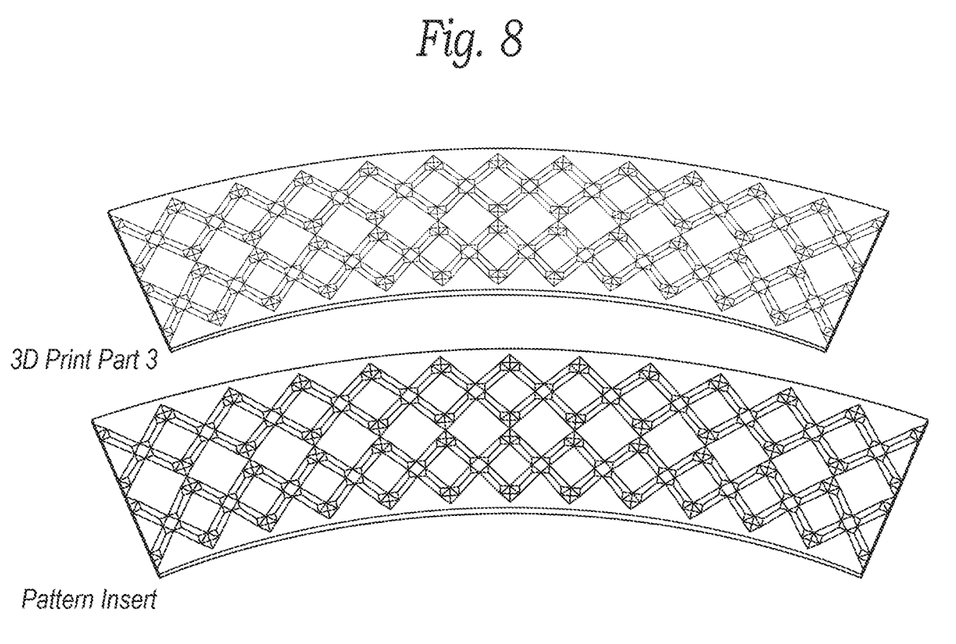
FIG. 8 is view of the silicone pattern insert used to make the production molds.
Figure 9:
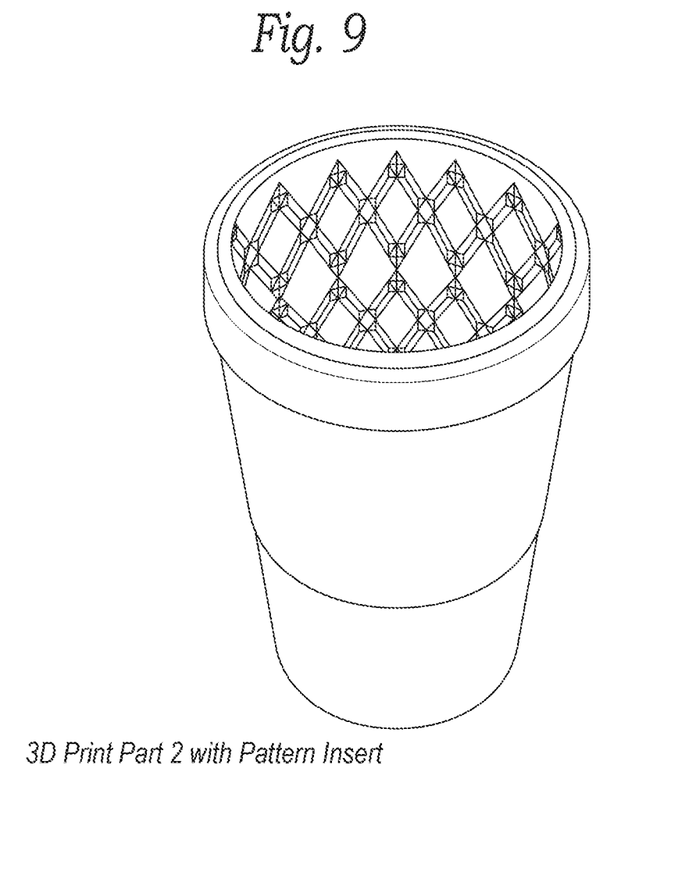
FIG. 9 is view of the pattern insert placed into a 3D printed part.
Figure 10:
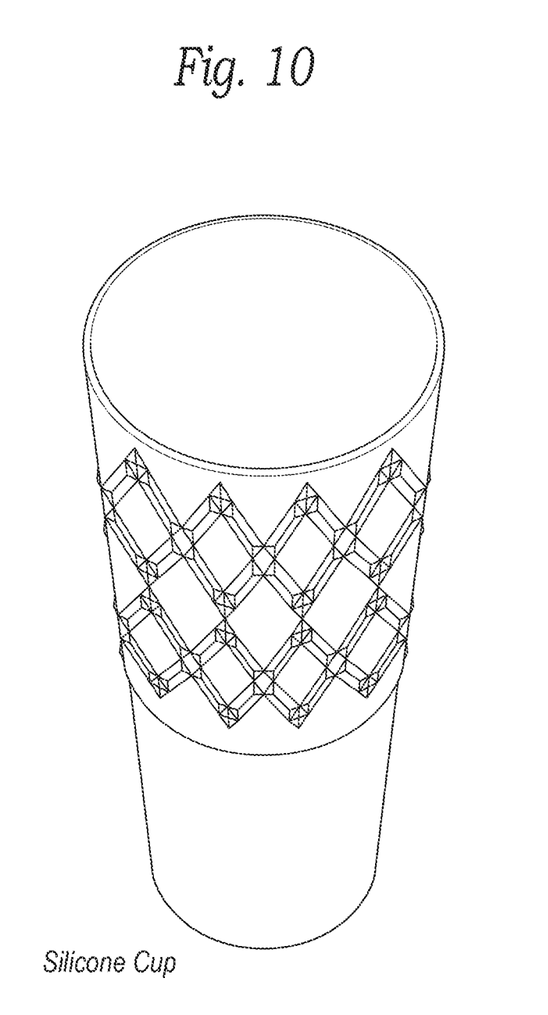
FIG. 10 is a perspective view of a silicone cup used to make production molds.
Figure 11:
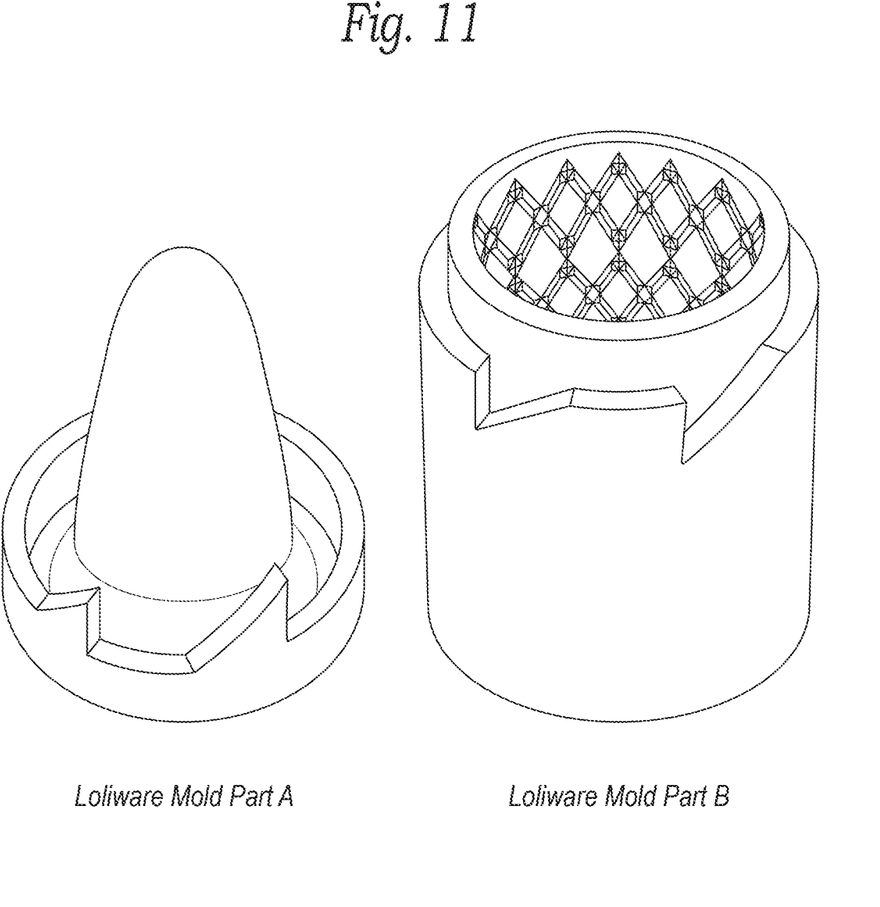
FIG. 11 is a view of a two-part production mold.

The edible cups of one embodiment are molded using a two-part food-grade silicone mold. For small scale production, each mold is made by hand using 3D printed pieces that were created using a 3D CAD program. Because the edible cup of this embodiment has a glossy, glass-like finish, a few extra steps are necessary in the mold production: a pattern piece must be printed separately to achieve this finish. As shown in FIG. 7, three separate parts (3D Print Part 1, 3D Print Part 2, 3D Print Part 3) are built in a 3D CAD program, such as Solidworks. These three parts are 3D printed using an additive fabrication device such as Objet Polyjet High Resolution 3D Printer. Once the printed parts are in hand, silicone rubber, such as Mold Star 15 Slow, is poured into 3D Print Part 3 to create the Pattern Insert shown in FIG. 8. The Pattern Insert is then placed into 3D Print Part 2 as shown in FIG. 9. 3D Print Part 2 (including the Pattern Insert) is inserted into 3D Print Part 1 to form a mold. Silicone Rubber is then poured into the mold formed by 3D Print Part 1 and 3D Print Part 2 (including the pattern insert) to form Silicone Cup as shown in FIG. 10. 3D Print Part 2 is removed to expose 3D Print Part 1 with Silicone Cup attached. A piece of sturdy plastic is wrapped around 3D Print Part 1 and Silicone Cup to form mold walls. Food-grade silicone rubber, such as Smooth-Sil 940, is poured to create Loliware Mold Part A, as shown in FIG. 11. The plastic mold walls are removed along with 3D Print Part 1, leaving Silicone Cup inside Loliware Mold Part A. Mold keys are cut into Loliware Mold Part A to help the two-part mold align correctly. Plastic mold walls are wrapped around Loliware Mold Part A. Food-grade silicone rubber is poured to create Loliware Mold Part B. Silicone Cup is removed, and Loliware two-part mold is ready for production as shown in FIG. 11.

Figure 12:
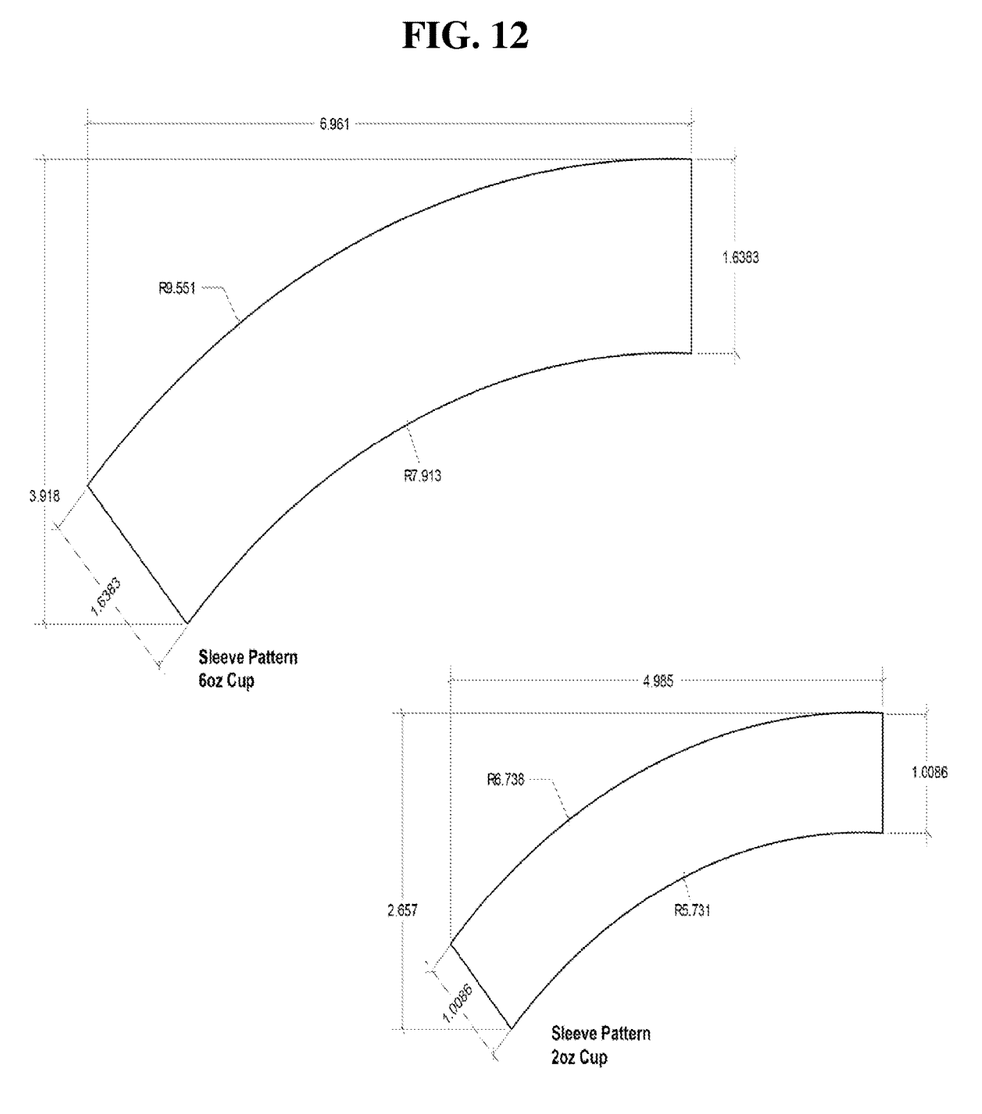
FIG. 12 is a technical drawing of a biodegradable sleeve used for hygienic purposes.

The edible cup according to an embodiment includes a biodegradable sleeve wrapped around the bottom section of the cup, which allows the edible cup to be served without the actual edible cup material being touched. A 2D drawing of this sleeve is shown in FIG. 12. portion of the cup, and is fastened at the back with a sticker. Both the sleeve and sticker are made from a biodegradable material, which allows the entire cup to be composted. In a preferred embodiment of the sleeve, Grafix Plastics Cellulose Acetate Film in 0.010" is used, and in a preferred embodiment of the sticker, EarthFirst PLA film is used. The form of the cup includes a small indentation where the sleeve is placed, allowing the sleeve to fit snuggly without sliding off the cup. Additional materials that may be used for the sleeve include paper, cardboard, wood, cloth, wax, biodegradable plastic, metals, rubbers, silicone, wood veneer, paper pulp, edible materials, colored cellulose leaves, flowers, straw, and other plant matter.

Other embodiments of edible containers not specifically mentioned are within the scope of the present invention. Such embodiments may be drinkware such as teacups, mugs, stemware, shot glasses, cocktail glasses, lowballs, highballs, flatware such as spoons, knives, forks, and utensils, tableware such as plates, saucers, and bowls, servingware such as platters, serving bowls, pitchers, and jugs, drinkware accessories such as straws, cup cozies, and coasters, and containers such as jars, bottles, lids, and other food containers.

The invention claimed is:

1. An edible container comprising:
    liquid;
    sugar; and
    a plurality of hydrocolloids, wherein the hydrocolloids are agar, carrageenan, and pectin,
    wherein the liquid has a concentration of 24% to 77% by weight, the sugar has a concentration of 5% to 48% by weight, the agar has a concentration of 0.2% to 0.78% by weight, the carrageenan has a concentration of 2.65% to 5.1% by weight, and the pectin has a concentration of 0.1% to 0.40% by weight, and
    wherein the edible container is able to contain a drink for at least one hour without leaking.

2. The edible container of claim 1, wherein the liquid has a concentration of 25% to 76% by weight and the sugar has a concentration of 5% to 41% by weight.

3. The edible container of claim 1, further comprising vegetable glycerin, $CaCl_2$, and citric acid.

4. The edible container of claim 1, further comprising a coloring agent.

5. The edible container of claim 4, wherein the coloring agent is white, orange, red, green, or yellow.

6. The edible container of claim 1, further comprising a flavoring agent.

7. The edible container of claim 6, wherein the flavoring agent is vanilla, lemon, bitters, jalapeno, or lime.

8. The edible container of claim 1, wherein at least some of the container is opaque.

9. The edible container of claim 1, wherein at least some of the container is clear and colorless.

10. The edible container of claim 1, wherein the container is flexible.

11. The edible container of claim 1, wherein the container is able to hold liquids for up to twenty-four hours before degrading.

12. The edible container of claim 1, wherein the container is able to contain liquids ranging in temperature from 32 to 180 degrees Fahrenheit.

13. The edible container of claim 1, wherein at least a portion of the edible container is translucent.

14. The edible container of claim 1, wherein the edible container is coating free.

* * * * *